United States Patent [19]

Bose

[11] 4,418,308
[45] Nov. 29, 1983

[54] SCALAR DECOUPLED CONTROL FOR AN INDUCTION MACHINE

[75] Inventor: Bimal K. Bose, Latham, N.Y.

[73] Assignee: General Electric Company, Schenectady, N.Y.

[21] Appl. No.: 406,589

[22] Filed: Aug. 9, 1982

[51] Int. Cl.$^3$ ............................................... H02P 5/34
[52] U.S. Cl. ................................... 318/803; 318/808; 318/811
[58] Field of Search .............................. 318/798–803, 318/805–811, 721–724, 717

[56] References Cited

U.S. PATENT DOCUMENTS 3,962,614 6/1976 Rettig ................................... 318/801
4,388,577 6/1983 Blaschke .......................... 318/803 X

OTHER PUBLICATIONS

E. H. Bristol – "The Right Half Plane Will Get You If You Don't Watch Out", Paper presented at 1981 Joint Automatic Control Conf., Paper No. TA-7A.
S. A. Kaufman & A. B. Plunkett, "A High Performance Torque Controller Using a Voltage Source Inverter and Induction Machine"– 1981 IEEE Industrial Application Soc. Conf. Record, pp. 863–871.
L. J. Garces, "Parameter Adaption for the Speed Controlled Static AC Drive With Squirrel Cage Induction Motor"– 1979, IEEE Industrial Application Soc. Conf. Record, pp. 843–850.
A. Abbondanti, "Method of Flux Control in Induction Motors Driven by Variable Frequency, Variable Voltage Supplies", – IEEE Industrial Application Soc. Semiconductor Power Converter Conference, pp. 154–161, 177–184.

Primary Examiner—J. V. Truhe
Assistant Examiner—Patrick C. Keane
Attorney, Agent, or Firm—William H. Steinberg; James C. Davis, Jr.; Marvin Snyder

[57] ABSTRACT

A scalar control supplemented by a decoupler transfer function control is provided to develop frequency and voltage commands for a voltage controlled inverter driving an induction machine. The machine torque is controlled by the slip and corresponding torque producing component of stator current. The rotor flux is maintained constant by the flux component of stator current. The total stator current is controlled in the outer loop to hold rotor flux constant with desired torque during steady state conditions and the decoupler compensator varies stator voltage to maintain rotor flux constant during transient conditions.

7 Claims, 6 Drawing Figures

SCALAR DECOUPLED CONTROL FOR AN INDUCTION MACHINE

BACKGROUND OF THE INVENTION

This invention relates to a control for a solid state adjustable speed induction machine drive and more particularly to a control for achieving fast transient response.

Traditionally, induction motors have been controlled by scalar methods where all the control and feedback signals are processed in scalar (d.c.) form. Since an induction motor is basically a coupled system where a variation of either the voltage or frequency applied to the motor stator affects both the motor torque and rotor flux, scalar controls using feedback give inherently sluggish response. A commanded increase in the torque results in an initial temporary dip in the rotor flux due to inherent coupling which in turn decreases the motor torque. The feedback signal will gradually respond to restore the rotor flux and the commanded torque will be achieved.

Another type of induction motor control uses vector control methods. The a.c. machine is controlled as a d.c. machine by decoupling the flux and torque components of the stator currents. There are principally two different vector control methods. The first method is the closed loop or direct vector control method which achieves decoupling by using feedback of the rotor flux vectors and is used typically when operating above 10% of base speed where the flux vectors can be estimated or measured with reasonable accuracy. The second method is the open loop or indirect vector control method which depends on feedback of rotating electrical vectors which are synthesized by the addition of a slip angle to the rotor mechanical position vector. The open loop method can be used over the entire speed range including zero speed. The vector control methods while effective during steady state operation, strictly speaking, only achieve quasi decoupling during current transient conditions. The phasor diagrams used to explain the vector control operation are not strictly valid with respect to transient conditions when the machine response is governed by the direct-quadrature (d-q) axis equations. The quasi decoupling achieved is more decoupling than would be achieved without the control but less than full decoupling.

In applications where fast response is needed such as in servo applications and in motors used in driving rolling mills, d.c. machines are mainly used at present.

It is an object of the present invention to provide an induction motor control that achieves fast response at various operating points using a simplified control.

It is a further object of the present invention to achieve decoupling between the commanded frequency and rotor flux in a scalar control during static and dynamic conditions at all operating points.

It is a still further object of the present invention to provide a scalar decoupled control having fast transient response and four-quadrant operating capability.

SUMMARY OF THE INVENTION

In one aspect of the present invention an induction machine drive is provided which uses a scalar control supplemented by a decoupler function generator to maintain rotor flux constant during both steady state and transient conditions. The control provides a stator voltage command and a stator frequency command to control the variable frequency power supplied by a voltage fed inverter to the induction machine. An external machine torque command is used to generate a machine slip command. A stator current command is generated from the slip command by a first function generator which maintains rotor flux constant and generates the torque component of stator current during steady state conditions. The stator current command is compared to the actual stator current to develop an error signal. The error signal is used to generate a first stator voltage command. A stator frequency command is obtained by adding a signal representative of the rotor frequency to the slip command. A second function generator is responsive to changes in the frequency command and provides a time dependent output to compensate the first stator voltage command to maintain the rotor flux constant during transient conditions.

BRIEF DESCRIPTION OF THE DRAWING

The features of the invention believed to be novel are set forth with particuarlity in the appended claims. The invention itself, both as to organization and method of operation, together with further objects and advantages thereof, may best be understood by reference to the following description taken in conjunction with the accompanying drawing in which:

DETAILED DESCRIPTION OF THE INVENTION

Figure 1:
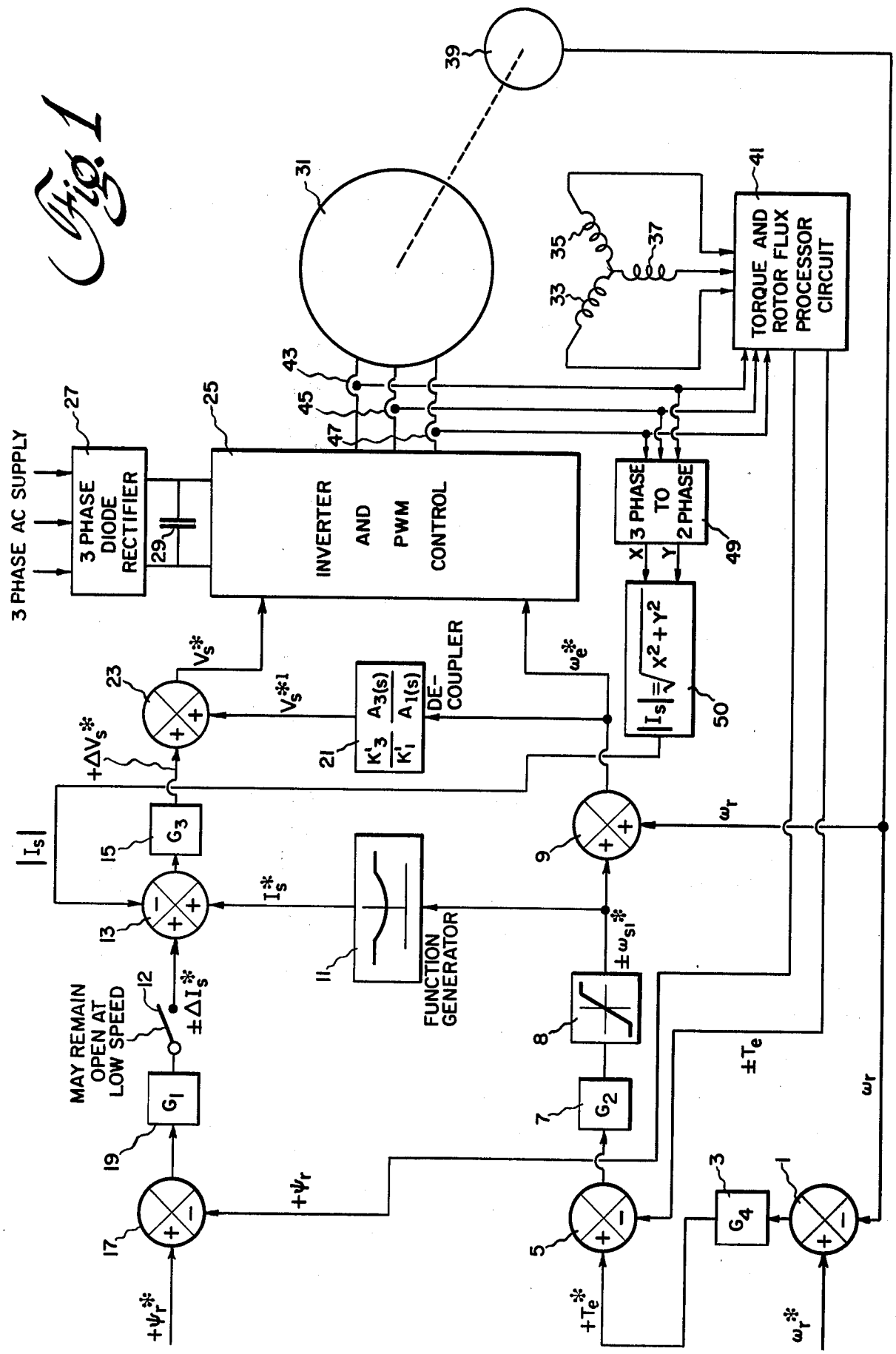
FIG. 1 is a part block diagram, part schematic diagram representation of a drive system including a decoupler, in accordance with the present invention.

Referring now to the drawing wherein like numerals indicate like elements, there is shown in FIG. 1 a speed control loop having an electrical speed command $\omega_r^*$. The commanded electrical speed is compared to the actual electrical rotor speed $\omega_r$ in summer 1. The relationship between the electrical rotor speed $\omega_r$ and the mechanical rotor speed $\omega_n$ is $\omega_r = (P/2)\omega_m$ where P is the number of poles, $\omega_r$ and $\omega_n$ are measured in radians/sec. The speed error signal is passed through a proportional plus integral regulator 3 to provide a torque command $T_e^*$ which when positive indicates motoring and when negative indicates regeneration. The commanded torque is compared to the calculated torque $T_e$ in summer 5. The torque error signal is passed through a proportional plus integral regulator 7 to provide a slip command $\omega_{s1}^*$. A limiter circuit 8 limits the maximum and minimum values of the slip command. The slip command from limiter circuit 8 is added to the rotor speed $\omega_r$ in a summer 9 to obtain a stator voltage frequency command $\omega_e^*$ measured in radians/sec. The slip command is also provided to a function generator 11 to determine the stator current command $I_s^*$ to achieve constant rotor flux $\omega_r$ and regulate torque component of stator current. The relationship between stator currents $I_s$ and slip $\omega_{sl}$ is shown in equation (1).

$$I_s = \frac{\psi_r}{M} \sqrt{1 + \frac{L_r^2}{R_r^2} \omega_{sl}^2} \quad (1)$$

where
$\psi_r$ is the rotor flux;
m is the mutual inductance referred to the stator;
$L_r$ is the rotor inductance referred to the stator;
$R_r$ is the rotor resistance referred to the stator; and
$\omega_{sl}$ is the slip in radians per second.

As can be seen from equation (1) $I_s$ has two components. The first is a flux component and the other is related to slip and is the torque component. When the rotor flux is held constant the stator current is a function of the slip.

The stator current is offset at zero slip by a current equal to the magnetizing current so that during machine operation the rotor flux can be maintained constant during transitions through zero slip.

The desired stator current $I_s^*$ is compared to the actual stator current $I_s$ in a summer 13. The error signal is passed through a proportional plus integral regulator 15 to develop a first voltage command signal $\Delta \pm V_s^*$. If it is desired to achieve greater accuracy and to adjust for possible saturation effects, a feedback signal can be used to modify the error signal at summer 13 at speeds typically above 0.1 per unit by comparing the desired rotor flux with the measured rotor flux in a summer 17 and passing the resulting error signal through a proportional plus integral regulator 19 to provide the summer 13 with a stator current error signal $\Delta I_s$.

To achieve decoupling of the fundamental frequency command from the rotor flux, the fundamental frequency command $\omega_e^*$ is passed through a decoupler 21 to provide a compensating signal $V_s^{*\prime}$. The compensating signal and the first voltage command signal $\Delta \pm V_s^*$ are summed in a summer 23 to provide a compensated stator voltage command $V_s^*$. The compensated stator voltage command $V_s^*$ and the stator frequency command $\omega_e^*$ are the two command signals applied to a voltage-fed inverter with pulse width modulation (PWM) control 25. Inverter and PWM control 25 is supplied from a three phase a.c. supply (not shown) through a three phase diode rectifier 27, and the d.c. output of the three phase diode rectifier is applied to the inverter and PWM control 25. A capacitor 29 is connected across the input terminals of the voltage-fed inverter. The inverter and PWM control 25 comprises base drive circuits, a carrier waveform generator and a pulse width modulator. The inverter and PWM control supplies three phase pulse width modulated pulses to a three phase induction machine 31. The induction machine 31 has flux sensing coils 33, 35 and 37 inserted in the motor. A tachometer 39 is driven by the rotor of machine 31. A torque and rotor flux processor circuit 41 receives input signals of the three phase current supplied to the machine from sensors 43, 45 and 47 and air gap voltages from sensing coils 33, 35 and 37. The air gap voltages are integrated in processor circuit 41 to obtain the air gap fluxes.

Processor circuit 41 compensates the air gap flux with the machine rotor leakage reactance to obtain the rotor flux. The air gap voltages and machine currents are also used by processor circuit 41 to measure machine torque. A circuit for generating rotor flux and torque from machine currents and air gap voltages and which may be employed as a component of processor circuit 41, is shown in U.S. Pat. No. 4,258,302 and assigned to the same assignee as the present invention. Patent 4,258,302 is hereby incorporated by reference. If flux coils are not available, rotor flux can be calculated from stator voltages and currents. A stator current processor may typically be comprised of a three-phase to two-phase converter 49 and a circuit 50 which determines the square root of the sum of the squares of the two phase output of converter 49. The three-phase to two-phase converter 49 receives as input signals each of the three machine currents.

Figure 2:
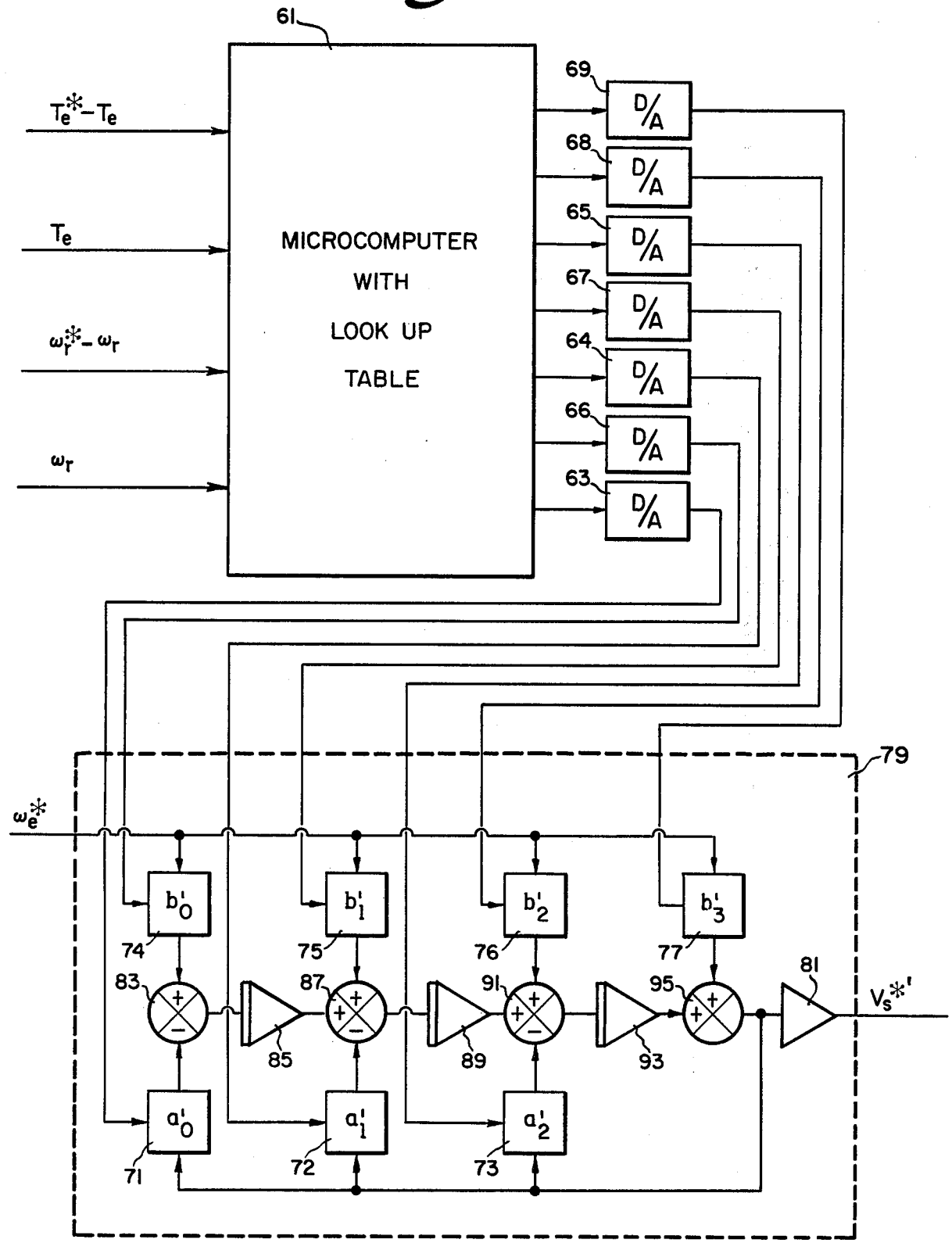
FIG. 2 is a block diagram representation of the decoupler of FIG. 1 and a look-up table controller to supply appropriate coefficients to the decoupler.

An implementation of the decoupler circuit 21 is shown in more detail in FIG. 2. A microcomputer with look-up table 61 receives as an input a signal corresponding to the difference between the commanded and actual torque $T_3^* - T_e$, the difference between the commanded rotor frequency and the actual rotor frequency $\omega_r^* - \omega_r$, the actual torque $T_e$ and the rotor frequency $\omega_r$. The torque command $T_e^*$ is developed from a speed control error in regulator circuit 3, the rotor speed is available from tachometer 39 (shown in FIG. 1) and the commanded rotor frequency can be obtained by subtracting commanded slip $\omega_{sl}\%$ from the commanded stator frequency $\omega_e^*$. The microcomputer has seven parallel outputs connected to seven digital-to-analog converters (DACs) 63-69. The DACs 63-69, are connected to multipliers 71-77, respectively, to adjust the coefficients $a_0'$, $a_1'$, $a_2'$, $b_0'$, $b_1'$, $b_2'$ and $b_3'$ according to the look-up table output.

The commanded stator frequency $\omega_e^*$ is the input signal to the analog decoupler circuit 79 and is connected to each of the multipliers 74-77. A summer 83 receives the output signal of multiplier 74 which is the product of the coefficient loaded into the multiplier by the microcomputer and the signal $\omega_e^*$, at a non-inverting input, and receives the output signal of multiplier 71 at an inverting input. The output of the summer 83 is connected to an analog integrator 85. A summer 87 receives at its non-inverting inputs the output signal from integrator 85 and multiplier 75 and at its inverting input the output of multiplier 72. The output of summer 87 is connected to an analog integrator 89. A summer 91 receives at its non-inverting inputs the output signal from multiplier 76 and integrator 89, respectively and at its inverting input the output signal of multiplier 73. The output of summer 91 is connected to an integrator 93. A summer 95 sums the output signals from integrator 93 and multiplier 77. The output of summer 95 is connected to an operational amplifier 81 for adjusting the scale and the polarity of the output signal. The output of the summer 95 is also connected to multipliers 71, 72 and 73. The output of amplifier 81 is the stator voltage command $V_s^{+\prime}$ which is supplied to the inverter.

Figure 3:
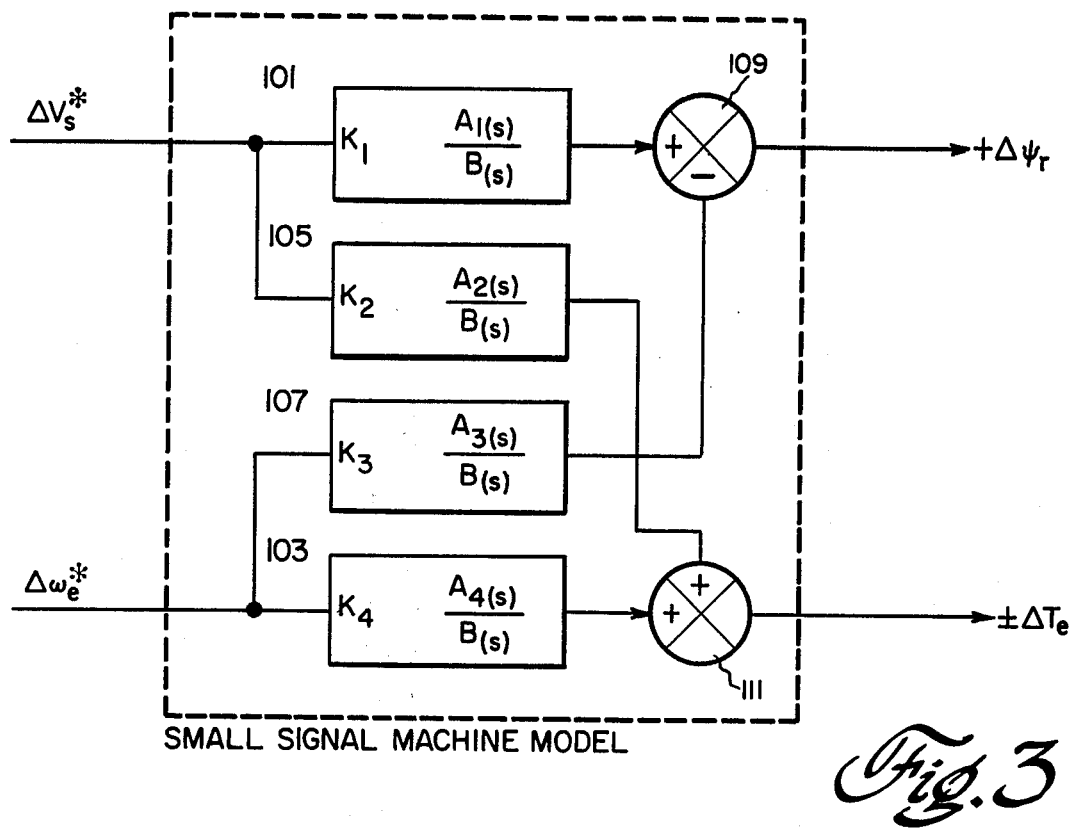
FIG. 3 is a block diagram representation of a small signal model of an induction motor.

The induction machine 31 can be modeled as a multivariable nonlinear coupled system where each of the outputs, rotor flux and machine torque, can be shown to be a function of the control variables stator voltage and frequency. The dynamics of the inverter and pwm control are neglected in the model. At any steady state operating point, the system can be linearized by a small signal perturbation method to arrive at the machine transfer functions as shown in FIG. 3. The transfer function $$K_1 \frac{A_1(s)}{B(s)}$$

in block 101 represents the contribution made by a change in stator voltage to the rotor flux. The transfer function $$\frac{K_4 A_4(s)}{B(s)}$$

in block 103 represents the contribution made by a change in commanded frequency to the machine torque. The transfer function $$K_2 \frac{A_2(s)}{B(s)}$$

of block 105 represents the contribution made by a change of stator voltage to the machine torque. The transfer function $$K_3 \frac{A_3(s)}{B(s)}$$

of block 107 represents the reduction of rotor flux resulting from a positive increase of commanded frequency. A summer 109 subtracts the contribution from block 107 from the contribution of block 101 to arrive at the rotor flux. A summer 111 adds the contribution from block 103 to the contribution of block 105 to arrive at the machine torque.

To explain how the model shown in FIG. 3 works, we will look at what happens when the frequency $\omega_e^*$ is incrementally increased, which can happen as a result of increase in the torque command. The rotor flux is reduced by the transfer function $K_3 A_3(s)/B(s)$. Since torque is being regulated by the slip control for a fixed rotor flux, the effect of $K_3 A_3(s)/B(s)$ has to be eliminated under all operating conditions to achieve a rapid response to changes by the torque command. To accomplish this, a decoupler transfer function shown in equation (2).

$$F(s) = K_3 \frac{A_3(s)}{B(s)} \times \frac{1}{K_1} \frac{B(s)}{A_1(s)} = \frac{K_3}{K_1} \frac{A_3(s)}{A_1(s)} \quad (2)$$

is implemented in decoupler circuit 21 with the gains $K_3$ and $K_1$ appropriately scaled to $K_3'$ and $K_1'$. To achieve rapid response to changes in torque command the rotor flux must be held constant during transient conditions. Compensating the voltage command for changes due to the frequency command decouples the frequency command from the rotor flux. If the machine model were linear, the decoupler parameters would always remain constant at different operating points. For a non-linear model as we have here, however, the machine transfer function parameters will vary at each operating point and therefore the decoupler has to be adaptive to compensate for these variations. To avoid computational rigor which causes real time delay in implementing the decoupler, a look-up table can be used to store precalculated results as will be described in further detail hereinbelow. The transfer function in equation (2) is a ratio of polynomials of the Laplace operator s. From the state equations of the system with given parameters, the steady state operating conditions are solved at different steady state operating points, the system is linearized by small signal perturbation and the poles and zeroes and gain are solved for the specified input and output variables, namely torque, flux and rotor frequency. The Laplace transform of the linearized system at a particular operating point is of the form shown in equation (3)

$$F(s) = C \frac{1 + D_1 s + D_2 s^2 + D_3 s^3}{1 + E_1 s + E_2 s^2 + E_3 s^3} \quad (3)$$

where C, $D_1$, $D_2$, $D_3$, $E_1$ $E_2$ and $E_3$ are constants and s is the Laplace operator.

Taking the inverse Laplace transform, equation (3) can be written in the form of a linear differential equation shown in expression (4)

$$\dddot{y} + a_2 \ddot{y} + a_1 \dot{y} + a_0 y = b_0 x + b_1 \dot{x} + b_2 \ddot{x} + b_3 \dddot{x} \quad (4)$$

where
$\dddot{y}$ is the third derivative with respect to time,
$\ddot{y}$ is the second derivative with respect to time,
$\dot{y}$ is the first derivative with respect to time:
and
$a_0$, $a_1$, $a_2$, $b_0$, $b_1$, $b_2$ and $b_3$ are constant coefficients.

Figure 4:
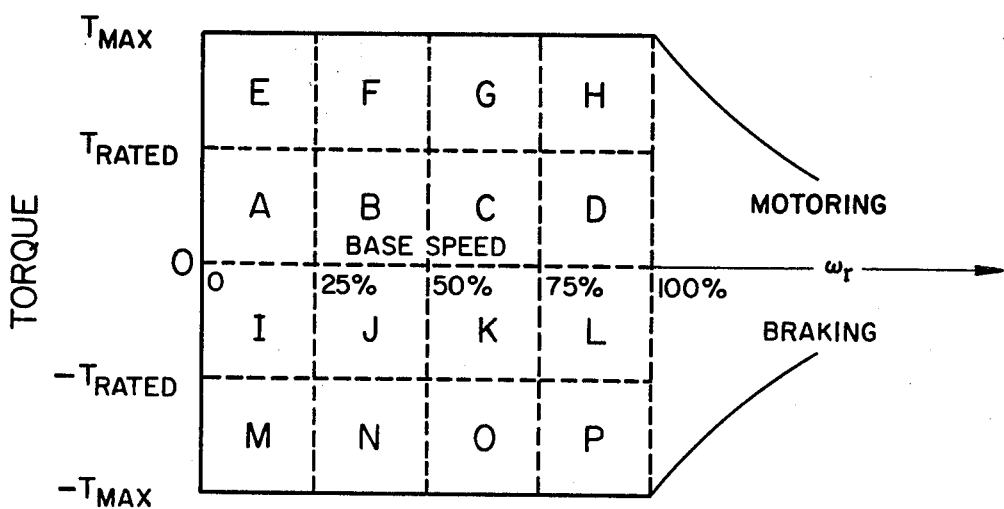
FIG. 4 is a graph showing the steady state operating cells in the T-$\omega_r$ plane of the look-up table employed in the apparatus of FIG. 2.

When the decoupler parameters are solved at different electrical steady state operating points in the torque and rotor speed plane, (rotor flux being kept constant) the resulting coefficients in the differential equations, after appropriate scaling to be usable in an analog circuit, are stored as shown in the look-up table in FIG. 4. The look-up table, whih is part of a microcomputer, can be divided into different cells shown lettered A-P. The torque, rotor flux and the rotor speed define the operating point parameters (rotor flux is held constant at all operating conditions). Operating points from zero to base speed and from zero to maximum motoring and generating torque are shown.

The coefficients stored in cell A correspond to operating points from zero to rated torque and from zero to 25% base speed. Therefore when the operating conditions fall anywhere within the cell the coefficients corresponding to cell A will be addressed. The appropriate coefficient are set by determining the operating point in the torque and rotor frequency plane during steady state conditions and setting the appropriately scaled coefficients $a_0'$, $a_1'$, $a_2'$, $b_0'$, $b_1'$, $b_2'$ and $b_3'$ in the analog computer shown in FIG. 2. As evident in FIG. 2, there are seven coefficients and therefore seven output lines from the look-up table memory as shown in FIG. 4. The coefficients are changed from digital to analog signals in digital to analog converters (DACs) to set the coefficients in the analog circuit 79 shown in FIG. 2.

The operation of the controller shown in FIG. 1 will now be described. A speed command $\omega_r^*$ is supplied to a speed control loop which generates a torque command for the torque control loop. The torque is controlled by the slip command $\omega_{sl}^*$ which is obtained from the torque control loop. The difference between the commanded torque obtained from the speed control loop and the actual torque from the torque processor circuit 41 is applied to a proportional plus integral regulator 7 to generate the slip. The rotor speed from the tachometer 39 is added to the slip to obtain the voltage frequency command $\omega_e^*$ for the inverter. A stator current command $I_s^*$ is generated from the slip command by the function generator 11 to provide the desired constant rotor flux and generate the torque component of stator current during steady state conditions. The current loop error which is the difference between the commanded current $I_s^*$ and the actual current $I_s$ is determined by three-phase to two-phase circuit 49 and square root circuit 50 from motor currents and is applied to a proportional plus integral regulator 15 to generate the incremental signal $\Delta \pm V_s^*$ which adds to the decoupler command $V_s^{*'}$ to generate the inverter voltage command $V_s^*$. The input signal provided to the decoupler 21 is the commanded frequency.

The flux control loop may remain open throughout the entire speed range of the motor, but it is desirable to close the loop through a switch 12, typically when operating above 10% of the base speed, for precision control of machine rotor flux. The inverter commands of voltage magnitude $V_s^*$ and frequency $\omega_e^*$ are scalar analog signals which can be supplied either to a microprocessor pulse width modulator to generate inverter switching waves or processed through dedicated hardware as in the present embodiment.

Figure 5:
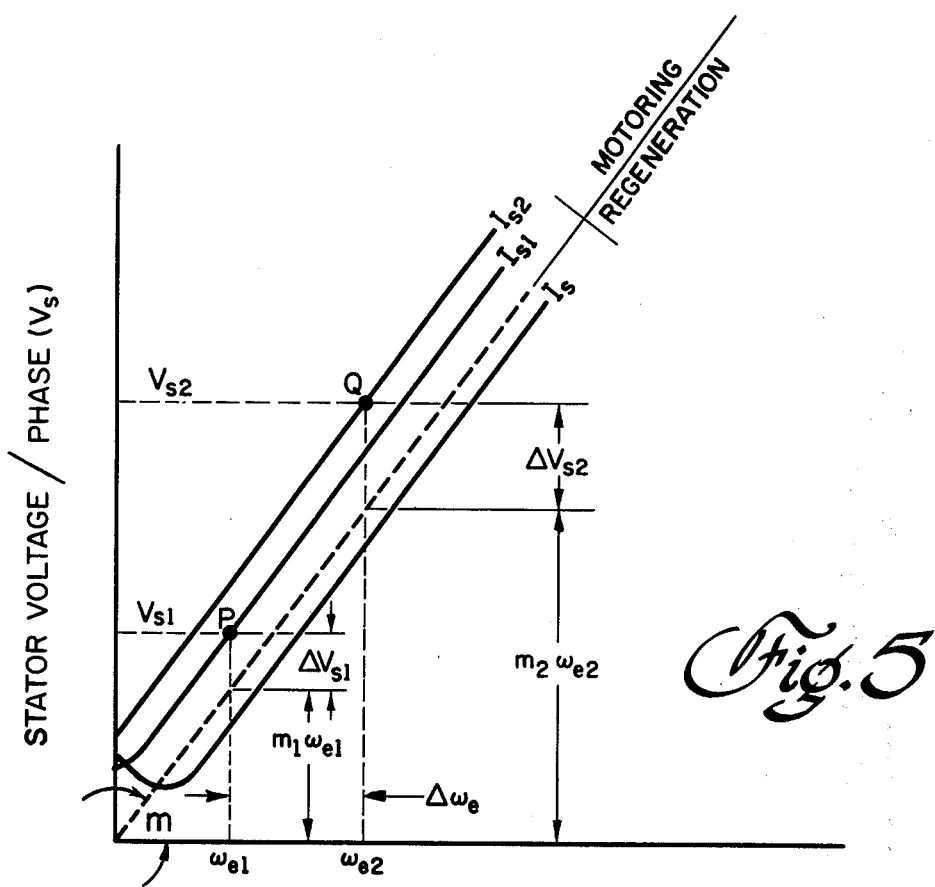
FIG. 5 shows steady state voltage-frequency curves for constant rotor flux, helpful in explaining the operation of FIG. 1.

FIG. 5 shows typical steady state voltage-frequency curves for constant rotor flux under both motoring and regenerating conditions. This figure helps to qualitatively explain the approximate operation of the control system in steady state conditions. The dotted line shows operation with zero slip. Assuming that the initial operating point is P, with the slope of the curve m corresponds to the gain $K_3'/K_1'$ of the decoupler, then the decoupler provides the voltage command $V_s^{*'}=m_1 \omega_{e1}$ which is supplemented by the current loop compensation $\Delta V_{s1}$ to attain the steady state point P. If the operating point is shifted to Q by incrementally increasing $\omega_{e1}$ to $\omega_{e2}$, the new commands are $m_2 \omega_{e2}$ and $\Delta V_{s2}$ from decoupler and current loop, respectively. In practical implementations, typically $m_1=m_2=m=K_3'/K_1'$ as shown in the figure.

Figure 6:
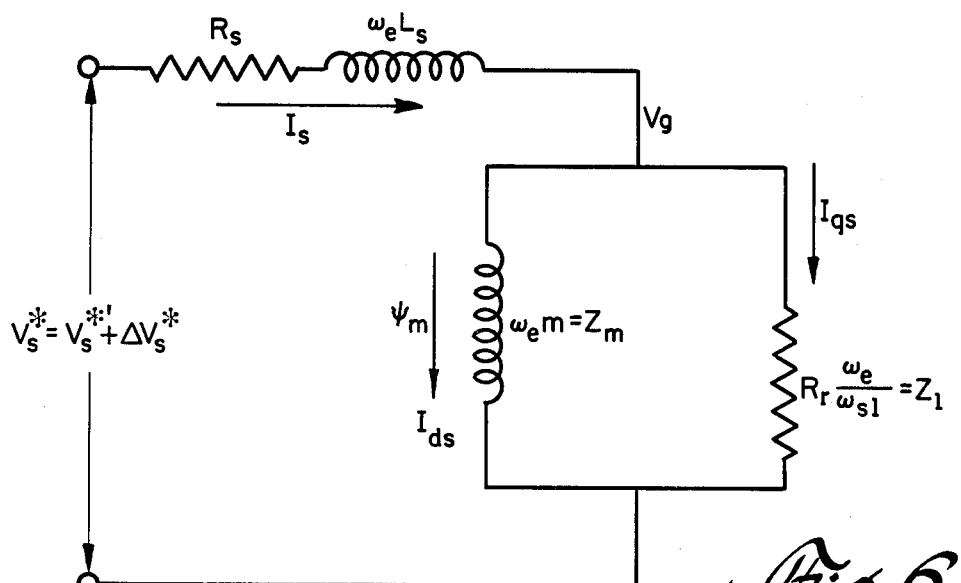
FIG. 6 shows a per phase steady state equivalent circuit of an induction motor with rotor leakage inductance helpful in explaining the operation of FIG. 1.

The transient operation of the decoupler will now be qualitatively explained with the help of FIG. 6 which shows the simplified per phase equivalent circuit neglecting the rotor leakage inductance. Here, $\psi_m = \psi_r$, $I_{ds}$ is the magnetizing or flux component of current and $I_{qs}$ is the torque component of the current. The stator resistance $R_s$ and the stator inductance $\omega_e L_s$ are shown in series with one another and the parallel combination of the magnetizing inductance $Z_m$ referred to the stator and the rotor impedance $Z_1$ referred to the stator. Assuming slip remains constant but speed gradually increases, the impedances $Z_m$ and $Z_1$ will increase proportional to frequency, which will correspondingly raise $V_s'$ by way of the decoupler. The stator current $I_s$ and the components $I_{ds}$ and $I_{qs}$ will remain the same and, therefore, $\Delta V_s^*$ will remain practically unaltered. If a transient increase of $\omega_e$ occurs due to the increase of $\omega_{s1}^*$, this will tend to decrease the size of $\psi_m$ and increase $I_{qs}$ for the same $I_s$, but the decoupler will transiently increase $V_s^{*'}$ to maintain $\psi_m$ constant. Meanwhile, the current control loop with a higher $I_s^*$ command will tend to restore a steady state condition by a $\pm \Delta V_s^*$ command.

When the steady state condition of the machine is reached as determined by the difference between commanded and actual torque and commanded and actual frequency being less than predetermined values, the coefficients stored in the cell in the memory corresponding to the constant values of torque and electrical speed are set in the analog circuit multipliers of FIG. 2 which implements the transfer function. The purpose of the decoupler, which is implemented by the analog circuit, is to compensate for the coupling between the frequency and rotor flux to keep the rotor flux constant during transient conditions and therefor provide a rapid response. When a new steady state condition is achieved, the coefficients in the look-up table corresponding to the present steady state torque and constant frequency values will be set in the analog computer multipliers. During steady state conditions, the decoupler provides a gain which, together with the stator current feedback loop, provides the constant flux level. During transient conditions the decoupler provides more than a gain; specifically, the decoupler provides a response that is dependent on the variation, with respect to time, of the input parameter (frequency) to counteract the interaction between frequency and rotor flux taking place in the induction machine so that constant rotor flux can be maintained. With constant rotor flux maintained during transient conditions, transient response to torque commands will be quick. The coupling between changes in commanded voltage and torque serves to increase the amount of torque response.

Assuming the machine is at zero speed and within rated torque, the coefficients associated with cell A are set in the multipliers, and a torque command for maximum torque then occurs. The machine will accelerate and when maximum torque is achieved at a constant machine speed (assuming a constant load), the coefficient corresponding to the operating point in the torque speed plane will be loaded in the multipliers. The coefficients in any one cell can be used for a transient response to any other cell during transient motoring or regenerating. The compensation of the decoupler will be most accurate when the least number of cells are traversed during transient conditions.

The foregoing described a scalar decoupled control for an induction machine that achieves fast response by decoupling the commanded frequency from the rotor flux during static and dynamic conditions at all operating points.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What is claimed is:

1. An induction machine drive for achieving fast transient response, comprising:
   a voltage fed inverter providing variable frequency a.c. power to the induction machine;
   torque sensing means coupled to said machine for generating a signal indicative of actual machine torque;
   first comparison means coupled to said torque sensing means for comparing a commanded torque signal to said signal indicative of actual machine torque to generate a commanded torque error;
   slip command generating means for generating a slip command from the commanded torque error;
   a first function generator coupled to said slip generating means and being responsive to commanded slip for providing a stator current magnitude command to maintain rotor flux constant during steady state condition at a predetermined value dependent on a predetermined relationship between slip and stator current, said stator current magnitude command providing a torque producing component;

stator current measuring means coupled to said induction machine for generating a signal indicative of actual stator current;

second comparison means coupled to said stator current measuring means and to said first function generator for comparing commanded stator current with actual stator current to generate a stator current error signal;

stator voltage command signal generating means responsive to said stator current error signal for generating a first stator voltage command signal;

signal generating means responsive to rotor speed of said machine for generating a signal indicative of actual rotor speed;

first summation means coupling said slip command generating means and signal generating means to said inverter, said first summation means adding said slip command to said actual rotor speed to generate a stator frequency command for said inverter;

a second function generator coupled to said summation means and being responsive to changes in commanded stator frequency for generating a decoupling signal to compensate said first stator voltage command to maintain rotor flux constant at said predetermined value during transient conditions due to changes in the commanded machine stator frequency; and second summation means coupling said second function generator and said stator voltage command signal generating means to said inverter, said second summation means adding the decoupling signal from said second function generator to said first stator voltage command signal for supplying a compensated stator voltage command signal to said inverter.

2. The induction machine drive of claim 1 wherein said second function generator comprises means for implementing a transfer function having changeable coefficients, means for determining when said machine is operating in steady state, and means for changing said coefficients of said transfer function implementation when said machine has been determined to be operating in steady state conditions to values dependent upon the present operating point of the machine.

3. The induction machine of claim 2 wherein said second function generator further comprises means for storing said coefficients for use in said transfer function implementation dependent on operating conditions.

4. The induction machine of claim 3 wherein said means for determining when said machine is operating in steady state comprises means for determining when the difference between commanded and actual torque is less than a predetermined limit and when the difference between the commanded frequency and the actual frequency is below a predetermined limit at the same time.

5. The induction machine drive of claim 4 wherein the present operating point of the machine during steady state used with said second function generator is determined by the actual measured torque and actual measured speed of the machine.

6. The induction machine drive of claim 1 further comprising third comparison means coupled to said signal generating means for comparing said signal indicative of actual rotor speed to a commanded speed signal, and regulator means coupled to said third comparison means and providing as an output signal said commanded torque signal.

7. The induction machine drive of claim 1 further comprising means for measuring rotor flux, means for generating a command proportional to the desired constant rotor flux, means for comparing the commanded to the actual rotor flux to develop an error signal, regulator means for adjusting said error signal to provide a stator current command, and means to increment the stator current error signal generated by said second comparison means by the amount of the regulator output.

* * * * *